United States Patent
Fukunaga et al.

(10) Patent No.: US 11,610,736 B2
(45) Date of Patent: Mar. 21, 2023

(54) ELECTRONIC COMPONENT

(71) Applicant: Murata Manufacturing Co., Ltd., Nagaokakyo (JP)

(72) Inventors: Daiki Fukunaga, Nagaokakyo (JP); Hideaki Tanaka, Nagaokakyo (JP); Masahiro Wakashima, Nagaokakyo (JP); Daisuke Hamada, Nagaokakyo (JP); Hironori Tsutsumi, Nagaokakyo (JP); Satoshi Maeno, Nagaokakyo (JP); Ryota Aso, Nagaokakyo (JP); Koji Moriyama, Nagaokakyo (JP); Akihiro Tsuru, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/368,909

(22) Filed: Jul. 7, 2021

(65) Prior Publication Data
US 2021/0350983 A1    Nov. 11, 2021

Related U.S. Application Data

(63) Continuation of application No. 16/547,641, filed on Aug. 22, 2019, now Pat. No. 11,094,464.

(30) Foreign Application Priority Data

Aug. 27, 2018    (JP) .............................. JP2018-158350

(51) Int. Cl.
*H01G 4/12*    (2006.01)
*H01G 4/012*    (2006.01)
(Continued)

(52) U.S. Cl.
CPC ......... *H01G 4/1227* (2013.01); *H01G 4/0085* (2013.01); *H01G 4/012* (2013.01);
(Continued)

(58) Field of Classification Search
CPC ........ H01G 4/012; H01G 4/1227; H01G 4/33; H01G 4/248; H01G 4/0085; H01G 4/224; H01G 4/2325; H01G 4/30
See application file for complete search history.

(56) References Cited

U.S. PATENT DOCUMENTS

| | | | |
|---|---|---|---|
| 2015/0348712 A1* | 12/2015 | Lee .......................... | H01G 4/30 156/89.12 |
| 2016/0126014 A1* | 5/2016 | Lee ........................ | H01G 4/224 29/25.42 |

(Continued)

OTHER PUBLICATIONS

Fukunaga et al., "Electronic Component", U.S. Appl. No. 16/547,641, filed Aug. 22, 2019.

*Primary Examiner* — Michael P McFadden
(74) *Attorney, Agent, or Firm* — Keating & Bennett, LLP

(57) ABSTRACT

An electronic component includes a laminate in which a plurality of dielectric layers and a plurality of internal electrodes are alternately laminated and external electrodes electrically connected to the internal electrodes. A side margin portion as a region in which the plurality of internal electrodes is not provided when a section of the laminate having the length direction and the width direction is viewed from the laminating direction includes a plurality of side margin layers laminated in the width direction. An outer layer portion as a region in which the plurality of internal electrodes is not provided except for the side margin portion when a section of the laminate including the laminating direction and the width direction is viewed from the length direction includes a plurality of layer-margin layers laminated in the laminating direction.

14 Claims, 10 Drawing Sheets

(51) Int. Cl.
*H01G 4/008* (2006.01)
*H01G 4/232* (2006.01)
*H01G 4/224* (2006.01)
*H01G 4/30* (2006.01)

(52) U.S. Cl.
CPC ............ *H01G 4/224* (2013.01); *H01G 4/2325* (2013.01); *H01G 4/30* (2013.01)

(56) References Cited

U.S. PATENT DOCUMENTS

2016/0284471 A1* 9/2016 Mizuno ................. H01G 4/1227
2017/0018363 A1* 1/2017 Tanaka ..................... H01G 4/30
2019/0189354 A1* 6/2019 Tanaka ................... H01G 4/232
2020/0168399 A1* 5/2020 Kim ....................... H01G 4/012

* cited by examiner

ELECTRONIC COMPONENT

CROSS REFERENCE TO RELATED APPLICATIONS

This application claims the benefit of priority to Japanese Patent Application No. 2018-158350 filed on Aug. 27, 2018. The entire contents of this application are hereby incorporated herein by reference.

BACKGROUND OF THE INVENTION

1. Field of the Invention

The present invention relates to an electronic component.

2. Description of the Related Art

In the related art, an electronic component including a laminate in which a plurality of internal electrodes and a plurality of dielectric layers are alternately laminated is known. As one of such electronic components, a multilayer ceramic capacitor in which external electrodes are formed on both end surfaces of a laminate is disclosed in Japanese Patent Application Laid-Open No. 2017-178684. Here, a region in which the internal electrodes are not provided in a section of the laminate viewed from a laminating direction is referred to as a side margin portion. A region in which the internal electrodes are not provided on both outsides of the internal electrodes in the laminating direction is referred to as an outer layer portion.

Here, in manufacturing of a multilayer ceramic capacitor, although an unfired laminate is fired, a shrinkage behavior during firing is different between a portion as an inner layer portion in which internal electrodes and dielectric layers are alternately laminated and a portion as the side margin portion and the outer layer portion in which the internal electrodes are not provided. Due to the difference in shrinkage behavior, peeling may occur between the layers in the laminate, and a gap may be formed.

SUMMARY OF THE INVENTION

Preferred embodiments of the present invention provide electronic components in each of which an occurrence of peeling or a gap between layers in a laminate is reduced or prevented.

According to a preferred embodiment of the present invention, an electronic component includes a laminate in which a plurality of dielectric layers and a plurality of internal electrodes are alternately laminated, and an external electrode electrically connected to the internal electrodes. The laminate includes a first main surface and a second main surface opposing each other in a laminating direction, a first side surface and a second side surface opposing each other in a width direction perpendicular or substantially perpendicular to the laminating direction, and a first end surface and a second end surface opposing each other in a length direction perpendicular or substantially perpendicular to the laminating direction and the width direction. A side margin portion is a region in which the plurality of internal electrodes is not provided when a section of the laminate having the length direction and the width direction is viewed from the laminating direction, and includes a plurality of side margin layers laminated in the width direction. An outer layer portion is a region in which the plurality of internal electrodes is not provided, further to the side margin portion, when a section of the laminate having the laminating direction and the width direction is viewed from the length direction, and includes a plurality of layer-margin layers laminated in the laminating direction.

A boundary may be provided between the side margin portion and the outer layer portion in the laminating direction. Si may be included in the plurality of layer-margin layers. A content of Si included in one of the layer-margin layers located on an outermost side in the laminating direction among the plurality of layer-margin layers may be larger than a content of Si included in remaining ones of the layer-margin layers other than the one of the layer-margin layers located on the outermost side.

Si may be included in the plurality of side margin layers. A content of Si included in one of the side margin layers located on an outermost side in the width direction among the plurality of side margin layers may be larger than a content of Si included in remaining ones of the side margin layers other than the side margin layer located on the outermost side.

A boundary may be provided between a plurality of the layer-margin layers adjacent to each other in the laminating direction.

A boundary may be provided between a plurality of the side margin layers adjacent to each other in the width direction.

In an electronic component according to a preferred embodiment of the present invention, the side margin portion in which the internal electrode is not provided includes the plurality of side margin layers, and the outer layer portion in which the internal electrode is not provided includes the plurality of layer-margin layers. Thus, it is possible to reduce or prevent a difference in shrinkage behavior between a portion as the inner layer portion in which the internal electrodes and the dielectric layers are alternately laminated and a portion as the side margin portion and the outer layer portion in which the internal electrodes are not provided, in a firing process in manufacturing an electronic component. It is possible to reduce or prevent an occurrence of peeling or a gap between the layers in the laminate.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a schematic diagram illustrating a ceramic green sheet on which a conductive film is formed; and FIG. 4B is a schematic diagram illustrating a form in which ceramic green sheets on which the conductive film is formed are laminated.

FIG. 8A is a diagram illustrating a case where a dummy internal electrode as the tone adjustment layer is not connected to an external electrode; and FIG. 8B is a diagram illustrating a case where the dummy internal electrode as the tone adjustment layer is connected to the external electrode.

DETAILED DESCRIPTION OF THE PREFERRED EMBODIMENTS

Hereinafter, features of the present invention will be specifically described with reference to preferred embodiments of the present invention and the accompanying drawings.

Descriptions will be made below using a multilayer ceramic capacitor as an example of an electronic component according to preferred embodiments the prevent invention.

The electronic component is not limited to a multilayer ceramic capacitor as described below, and may be any other electronic components, such as an inductor and an LC filter, for example.

Figure 1:
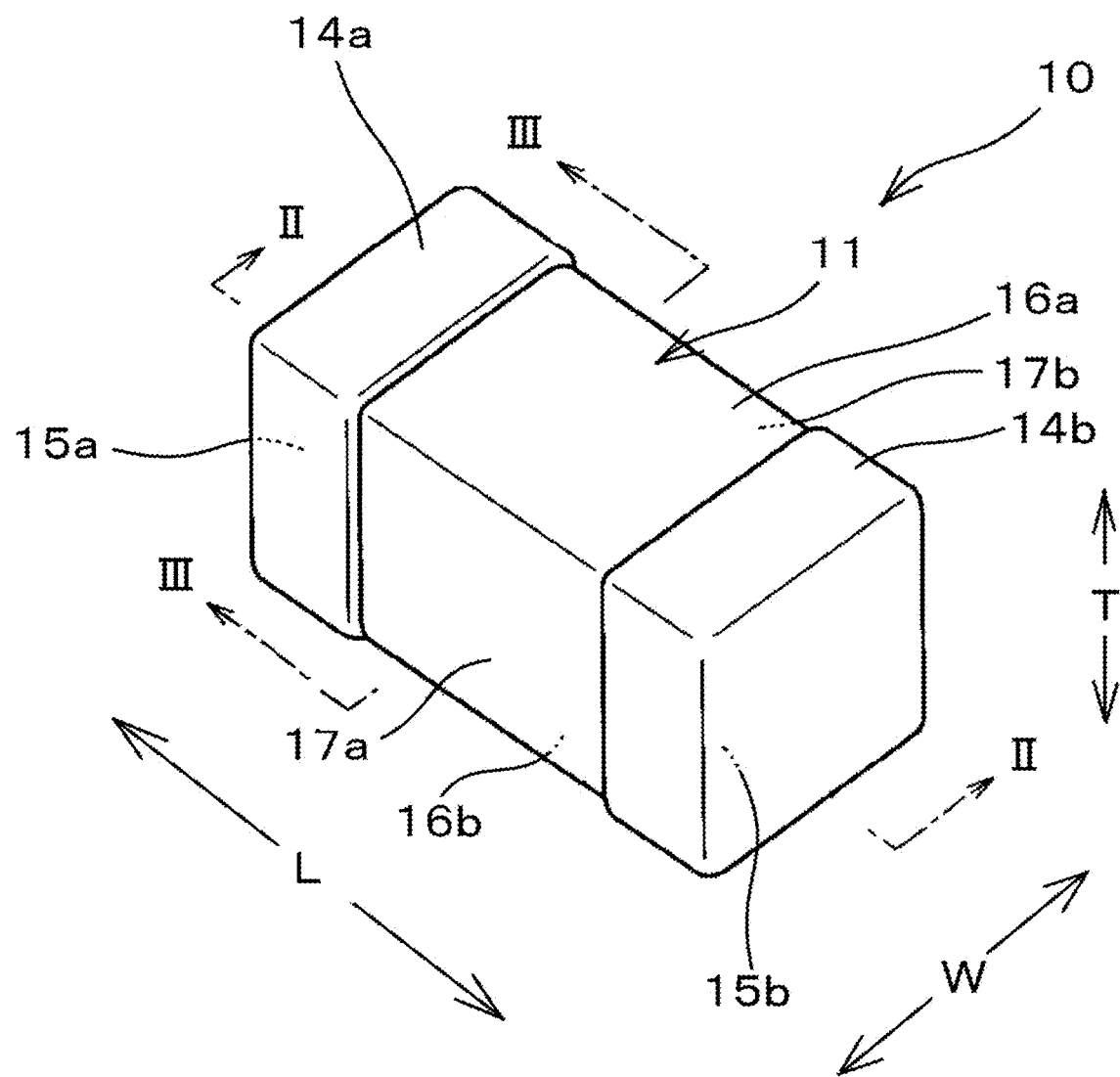
FIG. 1 is a perspective view illustrating an example of a multilayer ceramic capacitor according to a preferred embodiment of the present invention.
Figure 2:
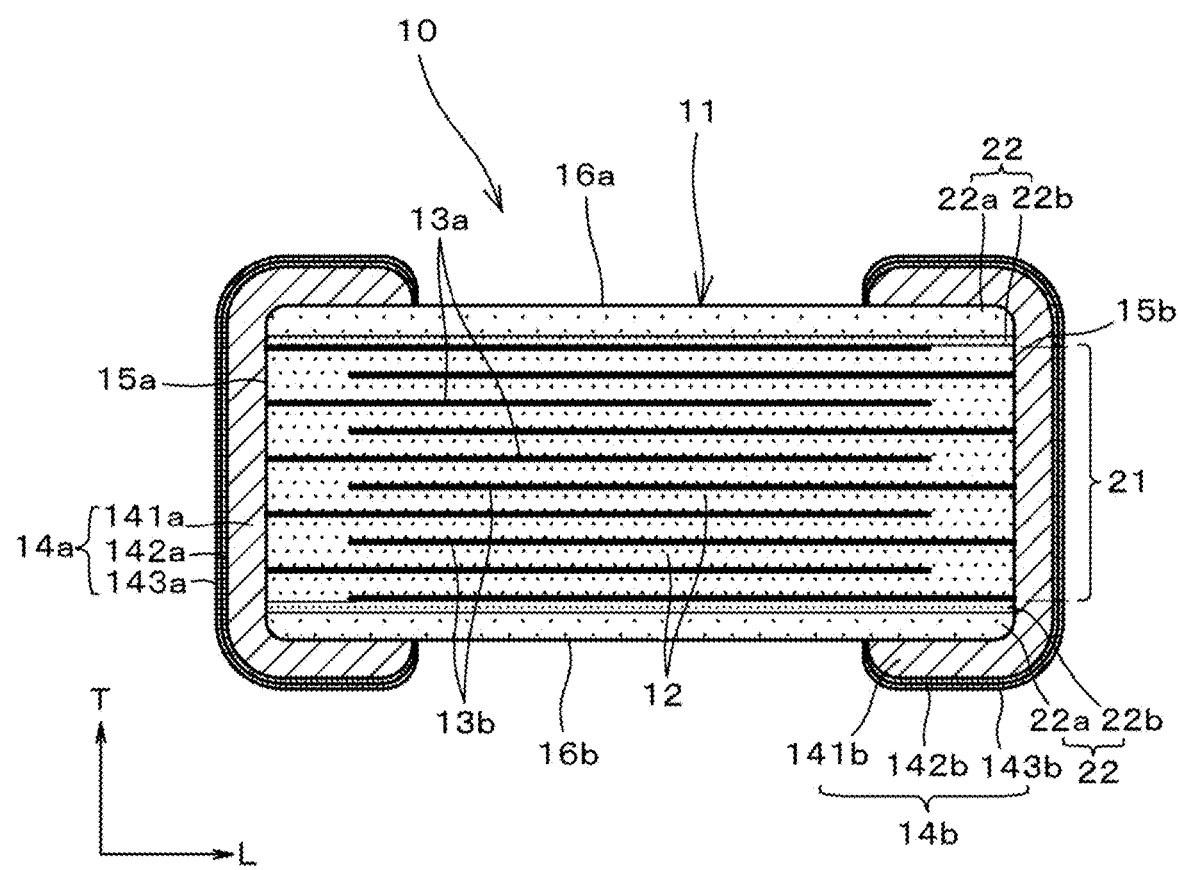
FIG. 2 is a sectional view of the multilayer ceramic capacitor illustrated in FIG. 1, taken along line II-II.
Figure 3:
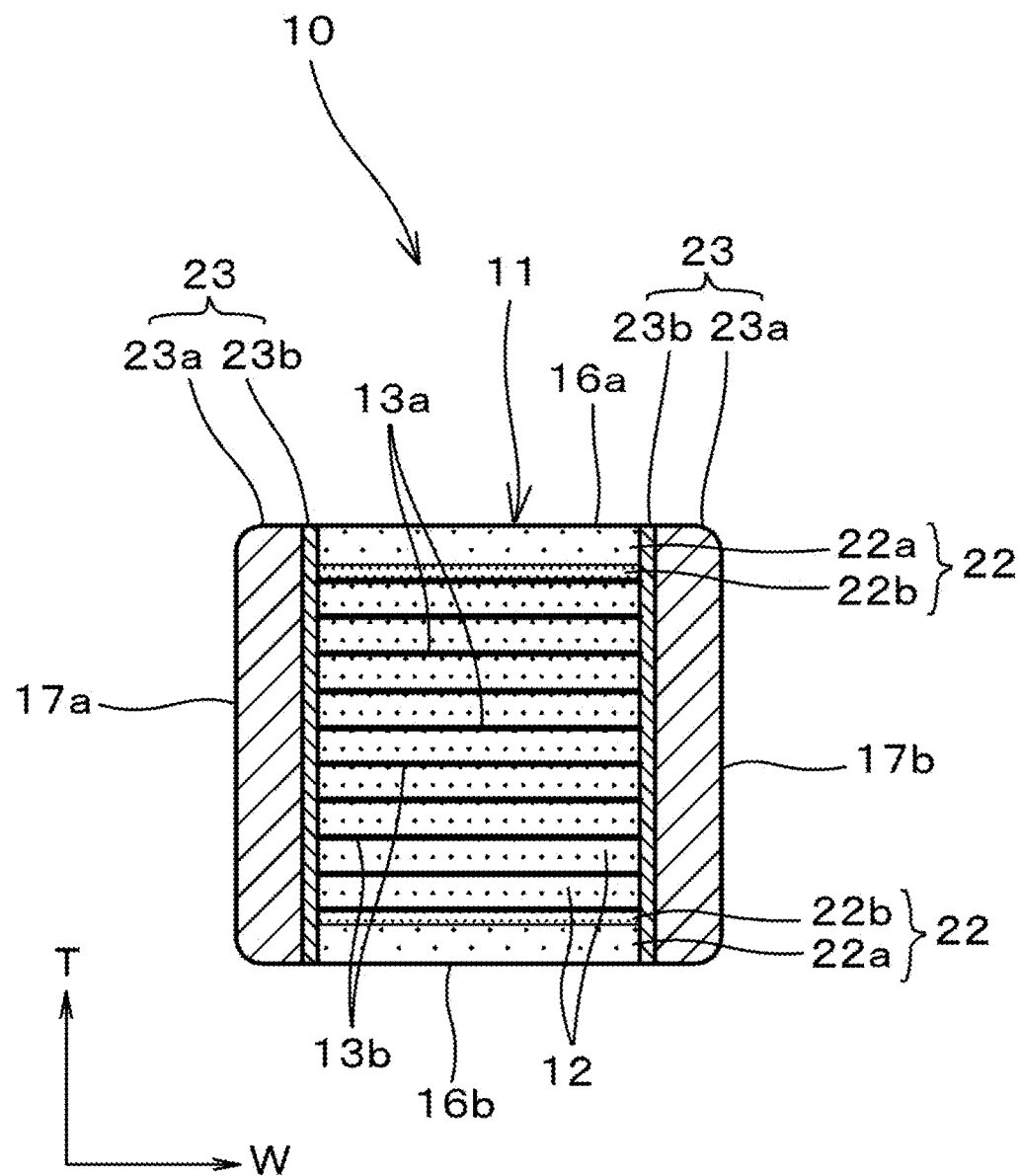
FIG. 3 is a sectional view of the multilayer ceramic capacitor illustrated in FIG. 1, taken along line III-III.

FIG. 1 is a perspective view illustrating an example of a multilayer ceramic capacitor 10 according to a preferred embodiment of the present invention. FIG. 2 is a sectional view of the multilayer ceramic capacitor 10 illustrated in FIG. 1, taken along line II-II. FIG. 3 is a sectional view of the multilayer ceramic capacitor 10 illustrated in FIG. 1, taken along line III-III.

As illustrated in FIGS. 1 to 3, the multilayer ceramic capacitor 10 preferably has a rectangular or substantially rectangular parallelepiped shape. The multilayer ceramic capacitor 10 includes a laminate 11 and a pair of external electrodes 14 (14a and 14b). The external electrodes 14a and 14b face each other, as illustrated in FIG. 1.

Here, a direction in which the external electrodes 14 defining the pair face each other is a length direction L of the multilayer ceramic capacitor 10. A direction in which internal electrodes 13 (13a and 13b) described later are laminated is a laminating direction T. A direction perpendicular or substantially perpendicular to both of the length direction L and the laminating direction T is a width direction W.

If the size of the multilayer ceramic capacitor 10 is described with respect to a dimension in the length direction L×a dimension in the width direction W×a dimension in the laminating direction T, sizes of, for example, about 1.6 mm×about 0.8 mm×about 0.8 mm. about 1.0 mm×about 0.5 mm×about 0.5 mm, about 0.6 mm×about 0.3 mm×about 0.3 mm, about 0.4 mm×about 0.2 mm×about 0.2 mm, and about 0.2 mm×about 0.1 mm×about 0.1 mm are preferable. Each of the dimensions has a tolerance of about ±10%.

The laminate 11 preferably includes a first end surface 15a and a second end surface 15b opposing each other in the length direction L, a first main surface 16a and a second main surface 16b opposing each other in the laminating direction T, and a first side surface 17a and a second side surface 17b opposing each other in the width direction W.

The first end surface 15a and the second end surface 15b extend in the width direction W and the laminating direction T. The first main surface 16a and the second main surface 16b extend in the length direction L and the width direction W. The first side surface 17a and the second side surface 17b extend in the length direction L and the laminating direction T.

The laminate 11 preferably includes rounded corners and rounded ridges. Here, the corner refers to a portion at which three sides of the laminate 11 intersect, and the ridge refers to a portion at which two sides of the laminate 11 intersect.

As illustrated in FIGS. 2 and 3, the laminate 11 preferably includes an inner layer portion 21, an outer layer portion 22, and a side margin portion 23.

The inner layer portion 21 includes a dielectric layer 12, a first internal electrode 13a, and a second internal electrode 13b. The dielectric layer 12 is interposed between the first internal electrode 13a and the second internal electrode 13b. The inner layer portion 21 is configured in a manner that a plurality of first internal electrodes 13a and a plurality of second internal electrodes 13b are alternately laminated with dielectric layers 12 interposed therebetween.

The dielectric layer 12 is preferably made of dielectric ceramic particles. For example, the dielectric ceramic particle preferably contains a perovskite type compound containing Ba and Ti as the main component and has a perovskite structure. At least one of Si, Mg, and Ba, for example, may preferably be added to the main components as an additive. The dielectric layer 12 may contain rare-earth elements such as Dy, Y, and Ho, for example. The thickness of the dielectric layer 12 is preferably, for example, about 0.2 µm or more and about 10 µm or less.

Here, a particle size of the dielectric ceramic particle may be set to be different between a central portion and an end portion of the dielectric layer 12 in the length direction L. For example, the particle size of the dielectric ceramic particle at the central portion of the dielectric layer 12 in the length direction L is preferably larger than the particle size of the dielectric ceramic particle at the end portion of the dielectric layer 12 in the length direction L.

Here, a thickness of the dielectric layer 12 (interposed between the first internal electrode 13a and the second internal electrode 13b) in the laminating direction T is referred to as an element thickness. In a multilayer ceramic capacitor 10 having an element thickness of about 0.8 µm or less, a preferred relationship between an average element thickness d of a plurality of dielectric layers 12 and the particle size D50 of the dielectric ceramic particle is as follows, for example:

Central portion in length direction L: $0.25d \leq D50 \leq 1.2d$

End portion in length direction L: $0.15d \leq D50 \leq 0.50d$

In order to set the particle size of the dielectric ceramic particle to be different between the central portion and the end portion of the dielectric layer 12 of the inner layer portion 21 in the length direction L, for example, a content of Mg per volume, which is included in the dielectric layer 12 of the inner layer portion 21 is preferably set to be different from the content of Mg per volume, which is included in the side margin portion 23 described later. As an example, the content of Mg per volume, which is included in the side margin portion 23 is about ten times or more as many as the content of Mg per volume, which is included in the dielectric layer 12 of the inner layer portion 21. A composition of the dielectric layer 12 in the side margin portion 23 is different from a composition of the dielectric layer 12 in the inner layer portion 21 in that a material having high density is used. Thus, it is possible to improve moisture resistance of the multilayer ceramic capacitor 10. The difference in content of Mg may be measured by the wavelength dispersive X-ray analysis. In a case of measuring the content in more detail, a transmission electron microscope is used.

The first internal electrode 13a and the second internal electrode 13b face each other with the dielectric layer 12 interposed therebetween in the laminating direction T. Electrostatic capacitance is generated at a portion at which the first internal electrode 13a and the second internal electrode 13b face each other with the dielectric layer 12 interposed therebetween.

The dielectric layer 12 extends in the width direction W and the length direction L. The first internal electrode 13a extends along the dielectric layer 12 in a plate shape and extends toward the first end surface 15a of the laminate 11. The second internal electrode 13b extends along the dielectric layer 12 in a plate shape and extends toward the second end surface 15b of the laminate 11.

The first internal electrode 13a and the second internal electrode 13b preferably include Ni, for example. The first internal electrode 13a and the second internal electrode 13b may preferably include, for example, metal such as Cu, Ag, Pd, Ag—Pd alloys, and Au, in addition to Ni. The first internal electrode 13a and the second internal electrode 13b may preferably include the same dielectric particles as the dielectric particles of the dielectric layer 12. The thickness of each of the first internal electrode 13a and the second internal electrode 13b is preferably about 0.3 μm or more and about 2.0 μm or less, for example.

A content of Si included at the end portions of the first internal electrode 13a and the second internal electrode 13b in the width direction W is preferably more than the content of Si included at the central portions of the first internal electrode 13a and the second internal electrode 13b in the width direction W. The difference in content of Si may be measured by the wavelength dispersive X-ray analysis. In a case of measuring the content in more detail, a transmission electron microscope, for example, is preferably used.

When a section of the multilayer ceramic capacitor 10 in the width direction W and the laminating direction T is viewed from the length direction L, positions of the end portions of the internal electrodes 13 may be aligned in the laminating direction or may have a relationship in which the central portion in the laminating direction bulges outward from the end portion in the laminating direction. In other words, the dimension of the internal electrode 13 (located at the central portion in the laminating direction) in the width direction W may be equal to or larger than the dimension of the internal electrode 13 (located at the end portion in the laminating direction) in the width direction W.

The outer layer portion 22 is preferably provided on both outsides of the inner layer portion 21 in the laminating direction T. That is, the inner layer portion 21 is preferably interposed between two outer layer portions 22 provided on both the outer sides in the laminating direction T.

When any section of the laminate 11 in the laminating direction T and the width direction W is viewed from the length direction L, the outer layer portion 22 refers to a region in which neither the first internal electrode 13a nor the second internal electrode 13b is provided, except for the side margin portion 23 described later.

The outer layer portion 22 includes a plurality of layer-margin layers. Specifically, the outer layer portion 22 includes an outer layer-margin layer 22a and an inner layer-margin layer 22b. The outer layer-margin layer 22a is located on the first main surface 16a and the second main surface 16b sides of the laminate 11. The inner layer-margin layer 22b is located on the inner layer portion 21 side.

A boundary between the outer layer-margin layer 22a and the inner layer-margin layer 22b may be observed by a difference of sinterability. Thus, it is possible to easily recognize that the outer layer portion 22 includes the plurality of layer-margin layers 22a and 22b, by using an optical microscope, for example. That is, the boundary is provided between the outer layer-margin layer 22a and the inner layer-margin layer 22b.

The dimension of the outer layer portion 22 in the laminating direction T is preferably about 5 μm or more and about 100 μm or less, for example. In the present preferred embodiment, the dimension of the outer layer-margin layer 22a in the laminating direction T is larger than the dimension of the inner layer-margin layer in the laminating direction T. For example, the dimension of the outer layer-margin layer in the laminating direction T is preferably about 5 μm or more and about 95 μm or less, and the dimension of the inner layer-margin layer in the laminating direction T is preferably about 5 μm or more and about 95 μm or less.

The outer layer portion 22 is preferably made of a dielectric ceramic material which is a dielectric and has a perovskite structure in which, for example, $BaTiO_3$ is provided as the main component, for example. As an additive, Si, for example, is preferably added to the main component.

The content of Si in the outer layer-margin layer 22a is more than the content of Si in the inner layer-margin layer 22b. That is, a mole ratio of Si/Ti in the outer layer-margin layer 22a is higher than the mole ratio of Si/Ti in the inner layer-margin layer 22b. For example, the mole ratio of Si/Ti in the outer layer-margin layer 22a is preferably about 3.5 or more and about 6.0 or less, and the mole ratio of Si/Ti in the inner layer-margin layer is preferably about 0.02 or more and about 3.5 or less. In a case of measuring the mole ratio of Si/Ti, a transmission electron microscope, for example, is preferably used.

Here, Si acts as a sintering aid. Thus, the outer layer-margin layer 22a obtained by firing in manufacturing the multilayer ceramic capacitor 10 has a denser structure than the structure of the inner layer-margin layer 22b. Thus, it is possible to improve solidity of the outer layer portion 22. Accordingly, cracks or chips occur less frequently in the outer layer portion 22, and it is possible to reduce or prevent penetration of moisture into the inside. It is possible to achieve both moisture resistance/solidity of the outer layer portion 22 and high-temperature reliability/voltage resistance in the vicinity of the outer layer portion 22. Since the outer layer portion 22 includes the outer layer-margin layer 22a and the inner layer-margin layer 22b, it is possible to stop the expansion of cracks, at an interface between the outer layer-margin layer 22a and the inner layer-margin layer 22b even in a case where cracks occur in the outer layer portion.

Since the outer layer portion 22 includes the plurality of layer-margin layers 22a and 22b, it is possible to reduce or prevent a difference in shrinkage behavior between the inner layer portion 21 in which the internal electrode 13 is provided, and the outer layer portion 22 in which the internal electrode 13 is not provided, in a firing process in manufacturing. That is, the inner layer-margin layer 22b has a function to reduce or prevent the difference in shrinkage behavior between the inner layer portion 21 and the outer layer-margin layer 22a, and thus, it is possible to reduce or prevent the difference in shrinkage behavior between the inner layer portion 21 and the outer layer portion 22.

When any section of the laminate 11 in the length direction L and the width direction W is viewed from the laminating direction T, the side margin portion 23 refers to a region in which neither the first internal electrode 13a nor the second internal electrode 13b is provided. As illustrated in FIG. 3, the side margin portion 23 is located on both outer sides in the width direction W. That is, two side margin portions 23 are provided to interpose the inner layer portion 21 and the outer layer portion 22 in the width direction W.

The side margin portion 23 includes a plurality of side margin layers laminated in the width direction W. Specifically, the side margin portion 23 includes an outer side margin layer 23a and an inner side margin layer 23b. The outer side margin layer 23a is located on the first side surface 17a and the second side surface 17b sides of the laminate 11. The inner side margin layer 23b is located on the inner layer portion 21 side.

A boundary between the outer side margin layer 23a and the inner side margin layer 23b may be observed by a difference of sinterability. Thus, it is possible to easily recognize that the side margin portion 23 includes the plurality of side margin layers 23a and 23b, by using an optical microscope. That is, the boundary is provided between the outer side margin layer 23a and the inner side margin layer 23b.

The dimension of the side margin portion 23 in the width direction W is, for example, about 5 µm or more and about 40 µm or less, and preferably about 20 µm or less. The dimension of the outer side margin layer 23a in the width direction W is larger than the dimension of the inner side margin layer 23b in the width direction W. For example, the dimension of the outer side margin layer 23a in the width direction W is preferably about 5 µm or more and about 20 µm or less, and the dimension of the inner side margin layer 23b in the width direction W is preferably about 0.1 µm or more and about 20 µm or less.

The dimension of the side margin portion 23 in the width direction W means an average dimension calculated by a measurement result which is obtained by measuring the dimension of the side margin portion 23 at a plurality of locations in the laminating direction T.

A non-limiting example of a method of measuring the dimension of the side margin portion 23 in the width direction W is as follows.

Firstly, a surface (referred to as "a WT section" below) of the multilayer ceramic capacitor 10 in the width direction W and the laminating direction T is exposed. Then, the end portions of the first internal electrode 13a and the second internal electrode 13b in the width direction W and any one of the two side margin portions 23 located on the outer sides in the width direction W, in the WT section, are imaged by an optical microscope to be provided in the same field of view. Imaging locations are three locations of an upper portion, a central portion, and a lower portion in the laminating direction T. In the upper portion, the central portion, and the lower portion, a plurality of line segments parallel or substantially parallel to the width direction W extends to the first side surface 17a and the second side surface 17b from the end portions of the first internal electrode 13a and the second internal electrode 13b in the width direction W, and then, the length of each of the line segment is measured.

Regarding the length of the line segment measured in this manner, an average value of the lengths at each of the upper portion, the central portion, and the lower portion is calculated. The dimension of the side margin portion 23 in the width direction W is obtained by averaging the average values.

With a similar method, the dimension of the outer layer portion 22 in the laminating direction T may be measured. That is, an average dimension calculated by a measurement result which is obtained by measuring the dimension of the outer layer portion 22 in the laminating direction T at a plurality of places in the length direction L is obtained.

The side margin portion 23 is preferably made of a dielectric ceramic material which is a dielectric and has a perovskite structure in which, for example, $BaTiO_3$ is provided as the main component. As an additive, Si, for example, is preferably added to the main component.

The content of Si in the outer side margin layer 23a is more than the content of Si in the inner side margin layer 23b. That is, a mole ratio of Si/Ti in the outer side margin layer 23a is higher than the mole ratio of Si/Ti in the inner side margin layer 23b. For example, the mole ratio of Si/Ti in the outer side margin layer 23a is preferably about 3.5 or more and about 6.0 or less, and the mole ratio of Si/Ti in the inner side margin layer is preferably about 0.02 or more and about 3.5 or less. In a case of measuring the mole ratio of Si/Ti, a WDX or a TEM, for example, may be used.

As described above, since Si acts as the sintering aid, the outer side margin layer 23a obtained by firing in manufacturing the multilayer ceramic capacitor 10 has a denser structure than the structure of the inner side margin layer 23b. Thus, it is possible to improve solidity of the side margin portion 23. Accordingly, cracks or chips occur less frequently in the side margin portion 23, and it is possible to reduce or prevent penetration of moisture into the inside. Since the side margin portion 23 includes the outer side margin layer 23a and the inner side margin layer 23b, it is possible to stop the expansion of cracks, at an interface between the outer side margin layer 23a and the inner side margin layer 23b even in a case where cracks occur in the side margin portion.

Since the side margin portion 23 includes the plurality of side margin layers 23a and 23b, it is possible to reduce or prevent a difference in shrinkage behavior between the inner layer portion 21 in which the internal electrode 13 is provided, and the side margin portion 23 in which the internal electrode 13 is not provided, in the firing process in manufacturing. That is, the inner side margin layer 23b has a function to reduce or prevent the difference in shrinkage behavior between the inner layer portion 21 and the outer side margin layer 23a, and thus, it is possible to reduce or prevent the difference in shrinkage behavior between the inner layer portion 21 and the side margin portion 23.

A boundary is provided between the outer layer portion 22 and the side margin portion 23 in the laminating direction T. That is, as illustrated in FIG. 3, the side margin portions 23 are provided on both the outsides of the outer layer portion 22 in the width direction W. Thus, the boundary is provided between the outer layer portion 22 and the side margin portion 23 in the laminating direction T.

The first external electrode 14a is provided on the entirety or substantially the entirety of the first end surface 15a of the laminate 11 and extends from the first end surface 15a to the first main surface 16a, the second main surface 16b, the first side surface 17a, and the second side surface 17b. The first external electrode 14a is electrically connected to the first internal electrode 13a.

The second external electrode 14b is provided on the entirety or substantially the entirety of the second end surface 15b of the laminate 11 and extends from the second end surface 15b to the first main surface 16a, the second main surface 16b, the first side surface 17a, and the second side surface 17b. The second external electrode 14b is electrically connected to the second internal electrode 13b.

In the present preferred embodiment, as illustrated in FIG. 2, the first external electrode 14a includes a three-layer structure defined by a first base electrode layer 141a, a first lower plating layer 142a on the surface of the first base electrode layer 141a, and a first upper plating layer 143a on the surface of the first lower plating layer 142a.

The first base electrode layer 141a covers the entirety or substantially the entirety of the first end surface 15a of the laminate 11 and to cover a portion of each of the first side surface 17a and the second side surface 17b and a portion of each of the first main surface 16a and the second main surface 16b from a portion at which the first base electrode layer 141a covers the first end surface 15a.

In the present preferred embodiment, as illustrated in FIG. 2, the second external electrode 14b includes a three-layer structure defined by a second base electrode layer 141b, a second lower plating layer 142b on the surface of the second base electrode layer 141b, and a second upper plating layer 143b on the surface of the second lower plating layer 142b.

The second base electrode layer 141b covers the entirety or substantially the entirety of the second end surface 15b of the laminate 11 and to cover a portion of each of the first side surface 17a and the second side surface 17b and a portion of each of the first main surface 16a and the second main surface 16b from a portion at which the second base electrode layer 141b covers the second end surface 15b.

The first base electrode layer 141a and the second base electrode layer 141b preferably contain, for example, metal such as Ni, Cu, Ag, Pd, Ag—Pd alloys, or Au. A plurality of first base electrode layers 141a and a plurality of second base electrode layers 141b may be provided.

The first base electrode layer 141a and the second base electrode layer 141b may be formed by, for example, co-firing, that is: being fired simultaneously with the first internal electrode 13a and the second internal electrode 13b, or may instead be formed by post-firing in which a conductive paste is applied onto the laminate 11, and then is baked. In a case where the first base electrode layer 141a and the second base electrode layer 141b are formed by co-firing, for example, it is preferable that the first internal electrode 13a and the second internal electrode 13b contain Ni, and the first base electrode layer 141a and the second base electrode layer 141b also contain Ni. The first base electrode layer 141a and the second base electrode layer 141b may be formed by direct plating or may be formed by hardening a resin layer including conductive particles and thermosetting resin, for example.

The first lower plating layer 142a and the second lower plating layer 142b preferably contain Ni, for example, in order to prevent solder breakage. The first lower plating layer 142a and the second lower plating layer 142b may contain, for example, metal such as Cu, Ag, Pd, Ag—Pd alloys, or Au in addition to Ni.

The first upper plating layer 143a and the second upper plating layer 143b preferably contain Sn, for example, in order to improve the mountability. The first upper plating layer 143a and the second upper plating layer 143b may contain, for example, metal such as Cu, Ag, Pd, Ag—Pd alloys, or Au in addition to Sn.

The configurations of the first external electrode 14a and the second external electrode 14b are not limited to the above-described configuration. For example, the first external electrode 14a and the second external electrode 14b may be formed by plating in a manner of performing direct plating on the laminate 11 if so desired.

Method of Manufacturing Multilayer Ceramic Capacitor

Figure 4A:
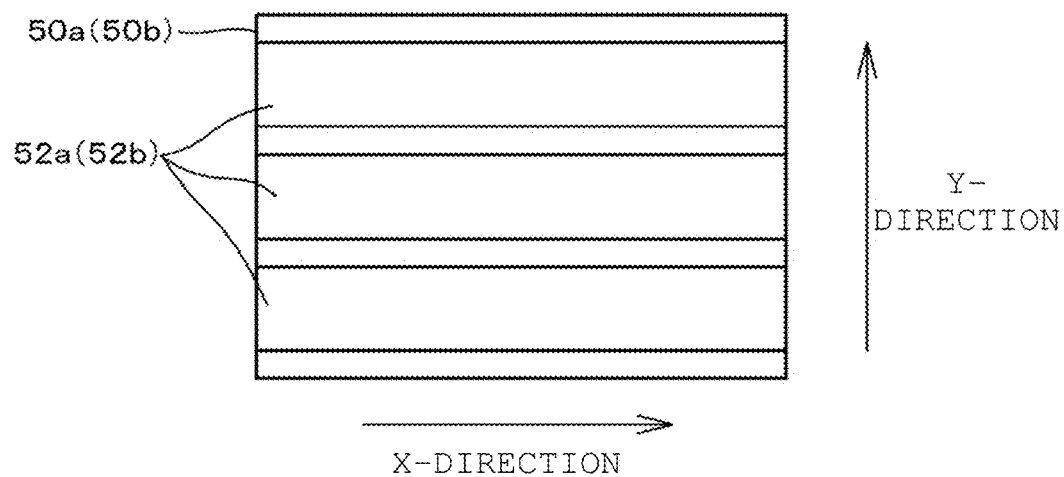
FIGS. 4A and 4B are diagrams illustrating an example of a method of manufacturing the multilayer ceramic capacitor in the preferred embodiment.
Figure 4B:
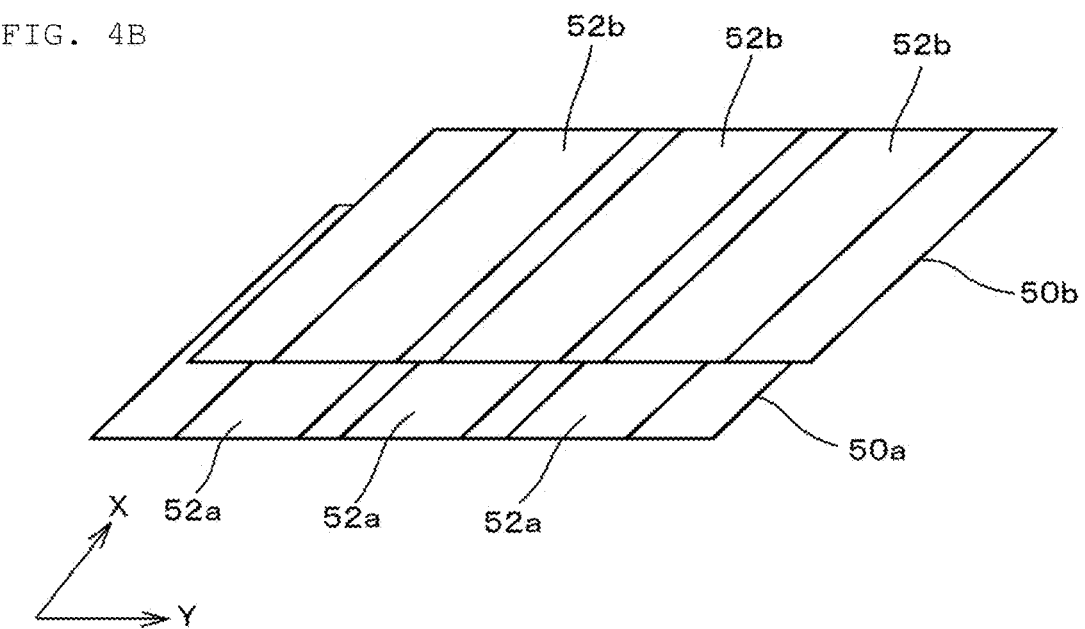

A non-limiting example of a method of manufacturing the multilayer ceramic capacitor 10 having the above-described structure will be described below. FIGS. 4A and 4B are diagrams illustrating the example of the manufacturing the multilayer ceramic capacitor 10 in accordance with a preferred embodiment of the present invention. FIG. 4A is a schematic diagram illustrating a ceramic green sheet in which a conductive film is formed. FIG. 4B is a schematic diagram illustrating a form in which ceramic green sheets in which the conductive film is formed are laminated.

Firstly, a perovskite type compound including Ba and Ti is preferably prepared as a dielectric material.

At least one of Si, Mg, and Ba as an additive, and an organic binder, an organic solvent, a plasticizer, and a dispersant, for example, are mixed, at a predetermined ratio, to dielectric powder obtained from the dielectric material, and thereby a ceramic slurry is produced.

Ceramic green sheets 50a and 50b are produced by coating surfaces of a plurality of resin films (not illustrated) with the produced ceramic slurry. The ceramic green sheet 50b is alternately laminated with the ceramic green sheet 50a. The ceramic green sheets 50a and 50b may be produced, for example, by using a die coater, a gravure coater, or a microgravure coater.

Then, as illustrated in FIG. 4A, a conductive paste used in making the internal electrode is applied onto the surfaces of the ceramic green sheets 50a and 50b in a stripe shape, and then is dried. Here, a direction in which the conductive paste used in making the internal electrode extends in the stripe shape is set to an X-direction, and a direction perpendicular or substantially perpendicular to the X-direction on the ceramic green sheet is set to a Y-direction. In this manner, a conductive film 52a (52b) becoming the first internal electrode 13a (second internal electrode 13b) is formed. As the applying method, various methods such as screen printing, ink jet printing, and gravure printing, for example, can be used.

A ceramic green sheet used in making the outer layer portion, which becomes the outer layer portion 22, is produced. A perovskite compound containing Ba and Ti is prepared as a dielectric material used in producing the ceramic green sheet for the outer layer portion. An additive preferably containing at least Si, an organic binder, an organic solvent, a plasticizer, and a dispersant are mixed, at a predetermined ratio, to dielectric powder obtained from the dielectric material, and thereby a ceramic slurry is produced. The ceramic green sheet used in making the outer layer portion is produced using the produced ceramic slurry.

Here, the content of Si included in the ceramic slurry for forming the outer layer-margin layer 22a of the outer layer portion 22 is adjusted to be larger than the content of Si included in the ceramic slurry used in forming the inner layer-margin layer 22b. For example, in the ceramic slurry used in making the outer layer-margin layer, the content of Si is preferably set to be about 3.5 mol or more and about 6.0 mol or less with respect to about 1 mol of Ti. In the ceramic slurry used in making the inner layer-margin layer, the content of Si is preferably set to be about 0.02 mol or more and about 3.5 mol or less with respect to about 1 mol of Ti.

The ceramic slurry is applied such that the thickness of the ceramic green sheet used in forming the outer layer-margin layer 22a is thicker than the thickness of the ceramic green sheet for forming the inner layer-margin layer 22b.

The ceramic green sheet becoming the inner layer-margin layer 22b is laminated on the ceramic green sheet becoming the outer layer-margin layer 22a. Then, a plurality of the ceramic green sheets 50a and 50b in which the conductive films 52a and 52b are formed is laminated in a state of being shifted from each other in the Y-direction, as illustrated in FIG. 4B. In this state, a mother laminate is obtained by laminating the ceramic green sheet becoming the inner layer-margin layer 22b and the ceramic green sheet becoming the outer layer-margin layer 22a in this order.

Figure 5A:
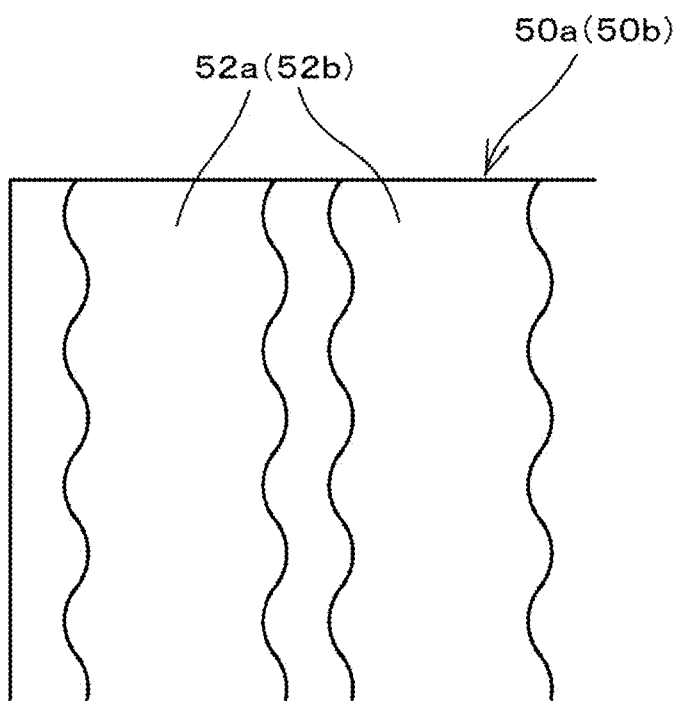
FIG. 5A is a diagram illustrating a state where an end portion of the conductive film in the width direction has a rippling shape.

Here, when the conductive films 52a and 52b are formed in the ceramic green sheets 50a and 50b by applying the paste, the end portions of the conductive films 52a and 52b in the width direction may have a rippling shape, not a straight line (see FIG. 5A). In this case, a saddle-shaped portion having a thickness thicker than others is formed at a portion of the conductive films 52a and 52b, which bulges in the width direction. If saddle-shaped portions are provided at positions overlapping each other in the laminating direction T, the ceramic green sheet becomes thin at this portion. Thus, in a case of obtaining the multilayer ceramic capacitor, there is a problem in that reliability decreases.

Figure 5B:
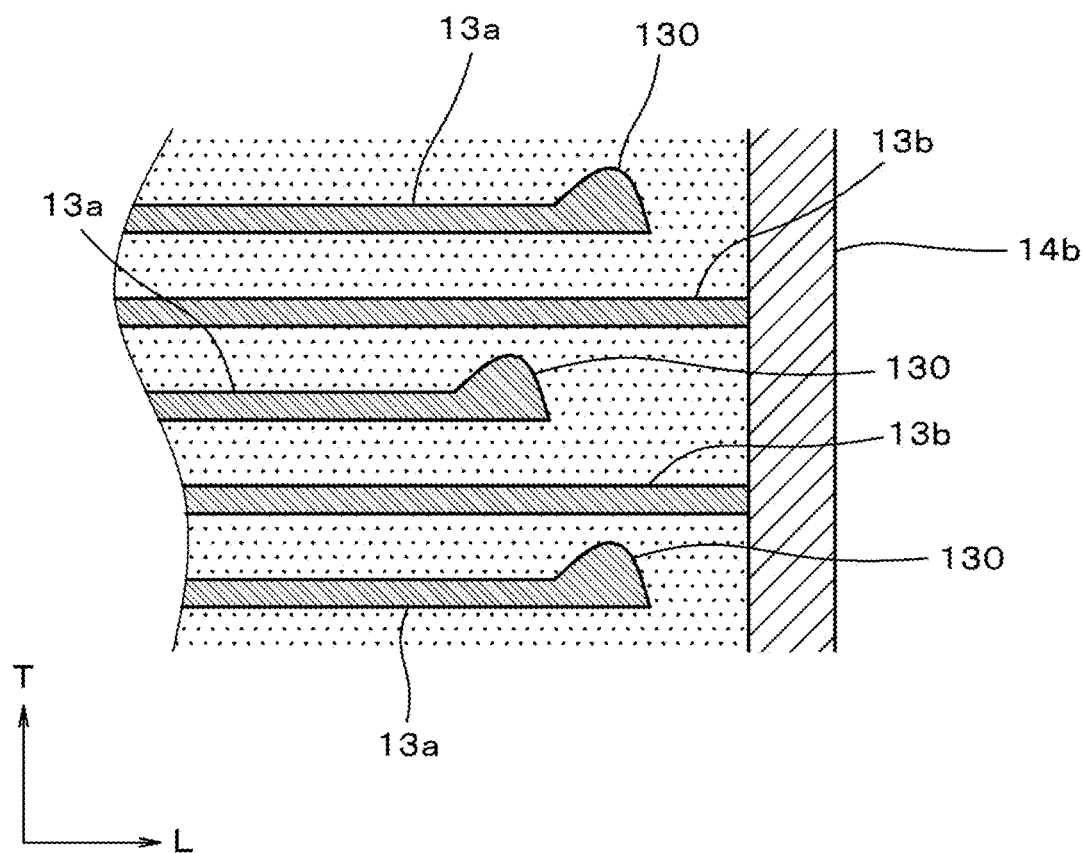
FIG. 5B is a sectional view illustrating a state where, regarding a first internal electrode formed by firing, saddle-shaped portions as thick portions of two first internal electrodes adjacent to each other in a laminating direction do not overlap each other in the laminating direction.

Thus, when a plurality of ceramic green sheets 50a is laminated such that end portions of conductive films 52a are located at the same or substantially the same position in the laminating direction T, the lamination is performed after the positions in the X-direction are adjusted such that saddle-shaped portions of the conductive films 52a in two ceramic green sheets 50a which are closest to each other in at least the laminating direction T do not overlap each other. Thus, regarding the first internal electrode 13a formed by firing, as illustrated in FIG. 5B, it is possible to prevent overlapping of the saddle-shaped portions 130 of two first internal electrodes 13a which are closest to each other in the laminating direction T.

Similarly, when ceramic green sheets 50b are laminated such that end portions of conductive films 52b are located at the same or substantially the same position in the laminating direction T, the lamination is performed after the positions in the X-direction are adjusted such that saddle-shaped portions of the conductive films 52b in two ceramic green sheets 50b which are closest to each other in at least the laminating direction T do not overlap each other. Thus, regarding the second internal electrode 13b formed by firing, it is possible to prevent overlapping of the saddle-shaped portions of two second internal electrodes 13b which are closest to each other in the laminating direction T.

The mother laminate is preferably pressed by a method, such as rigid press or isostatic press, for example. The pressed mother laminate is cut out to have a chip shape, and thus a laminated chip 60 illustrated in FIG. 6 is obtained.

Figure 6:
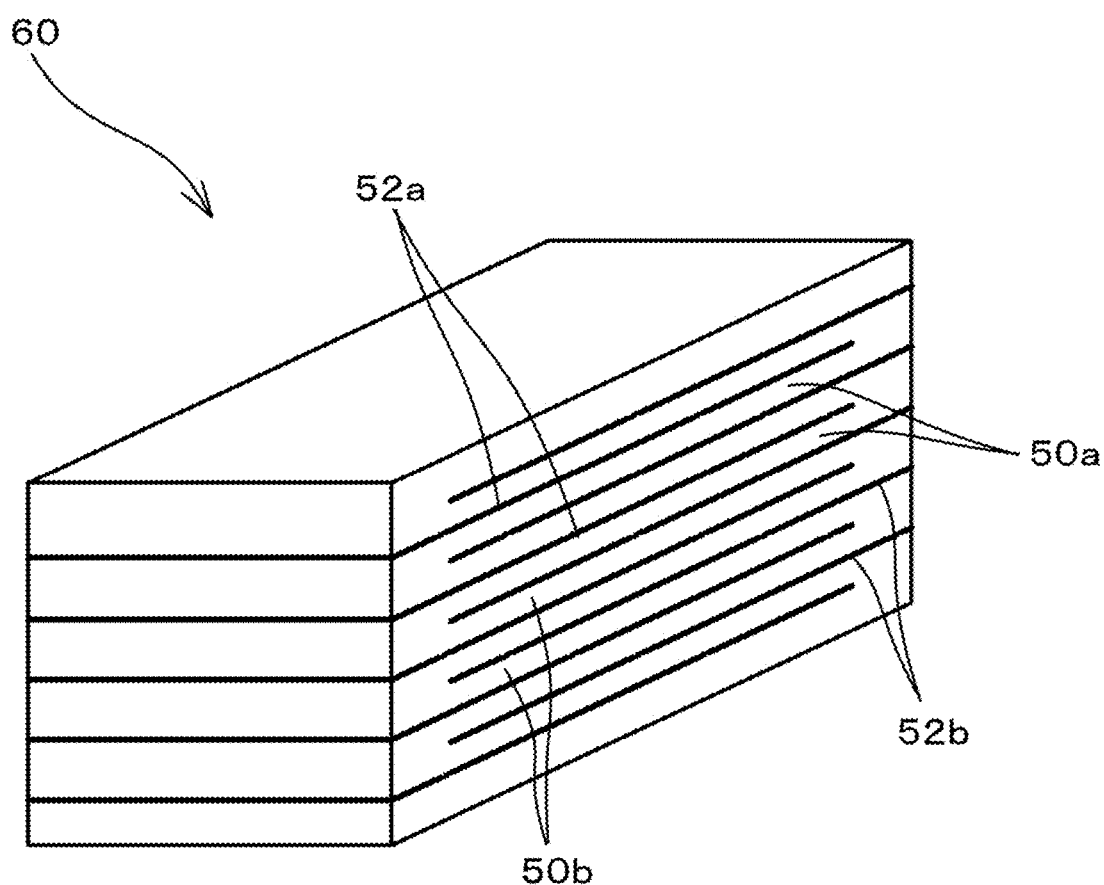
FIG. 6 is a perspective view illustration an example of an appearance of a laminated chip produced in the middle of manufacturing the multilayer ceramic capacitor.

As illustrated in FIG. 6, only the conductive film 52a of the ceramic green sheet 50a is exposed to one end surface of the laminated chip 60, and only the conductive film 52b of the ceramic green sheet 50b is exposed to the other end surface. The conductive film 52a of the ceramic green sheet 50a and the conductive film 52b of the ceramic green sheet 50b are exposed to each side surface of the laminated chip 60.

A ceramic green sheet for the side margin portion, which becomes the side margin portion 23 is produced. A perovskite compound including Ba and Ti is preferably prepared as a dielectric material for producing the ceramic green sheet for the side margin portion. An additive containing at least Si, an organic binder, an organic solvent, a plasticizer, and a dispersant, for example, are mixed, at a predetermined ratio, to dielectric powder obtained from the dielectric material, and thereby a ceramic slurry is produced. The ceramic green sheet for the side margin portion is produced using the produced ceramic slurry.

Preferably, many ceramic particles having a large particle shape index indicating the degree of roundness, that is, ceramic particles having uniform or substantially uniform shape and particle size are included in the ceramic green sheet for the side margin portion, in particular, in the ceramic green sheet use in forming the inner side margin layer 23b. If the particle size and the shape of the ceramic particles are uniform or substantially uniform, the resin included in the ceramic green sheet is likely to ooze through the surface. Thus, adhesiveness when the ceramic green sheet for the side margin portion is adhered on the laminated chip is improved.

A portion becoming the inner layer portion 21 and a portion becoming the side margin portion 23 shrink by the subsequent firing treatment. However, in order to reduce or prevent the difference in amount of shrinkage between the portions, the amount of the resin included in the ceramic green sheet for the side margin portion is set to be larger than the amount of the resin included in the ceramic green sheet used in forming the inner layer portion 21.

When the ceramic slurry is produced, the content of Si included in the ceramic slurry used in forming the outer side margin layer 23a is adjusted to be larger than the content of Si included in the ceramic slurry for forming the inner side margin layer 23b. For example, in the ceramic slurry of the outer layer-margin layer, the content of Si is preferably set to be about 3.5 mol or more and about 6.0 mol or less with respect to about 1 mol of Ti. In the ceramic slurry used in making the inner layer-margin layer, the content of Si is preferably set to be about 0.02 mol or more and about 3.5 mol or less with respect to about 1 mol of Ti.

The ceramic slurry is applied such that the thickness of the ceramic green sheet used in forming the outer side margin layer 23a is thicker than the thickness of the ceramic green sheet used in forming the inner side margin layer 23b.

Then, the ceramic green sheet used to make the inner side margin portion is laminated on the ceramic green sheet used in making the outer side margin portion, and bonding is performed, and thus the ceramic green sheet used in making the side margin portion, which has a two-layer structure, is obtained.

The ceramic green sheet used in making the inner side margin portion in the ceramic green sheet used in making the side margin portion and the side surface of the laminated chip 60, on which the conductive films 52a and 52b are exposed are preferably caused to face each other and are pressed by punching, for example. Thus, a layer becoming the side margin portion 23 is formed. With the similar method, the layer becoming the side margin portion 23 is formed on the opposite side surface.

Figure 7A:
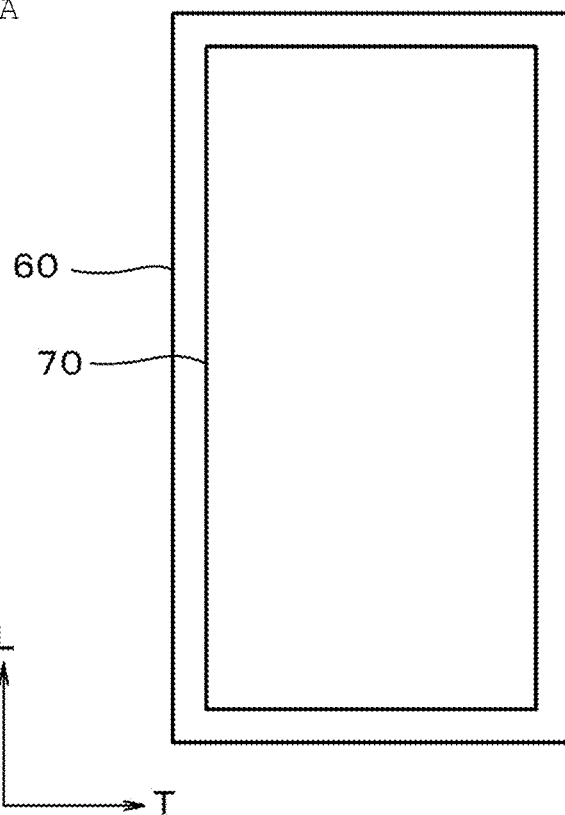
FIG. 7A is a diagram illustrating a state where a ceramic green sheet of a side margin portion, in which dimensions in a length direction and a width direction are shorter than a dimension of the laminated chip, is stuck on the laminated chip.

At this time, the ceramic green sheet used in making the side margin portion is not adhered on the ridge of the laminated chip on which the layer becoming the side margin portion 23 is formed. That is, as illustrated in FIG. 7A, for a ceramic green sheet 70 used in making the side margin portion, a ceramic green sheet in which the dimension in the length direction L is shorter than the dimension of the laminated chip 60 in the length direction L and the dimension in the width direction W is shorter than the dimension of the laminated chip 60 in the width direction W is prepared. Then, the ceramic green sheet 70 is preferably adhered to the laminated chip 60 while aligning the center positions of the ceramic green sheet and the laminated chip.

Figure 7B:
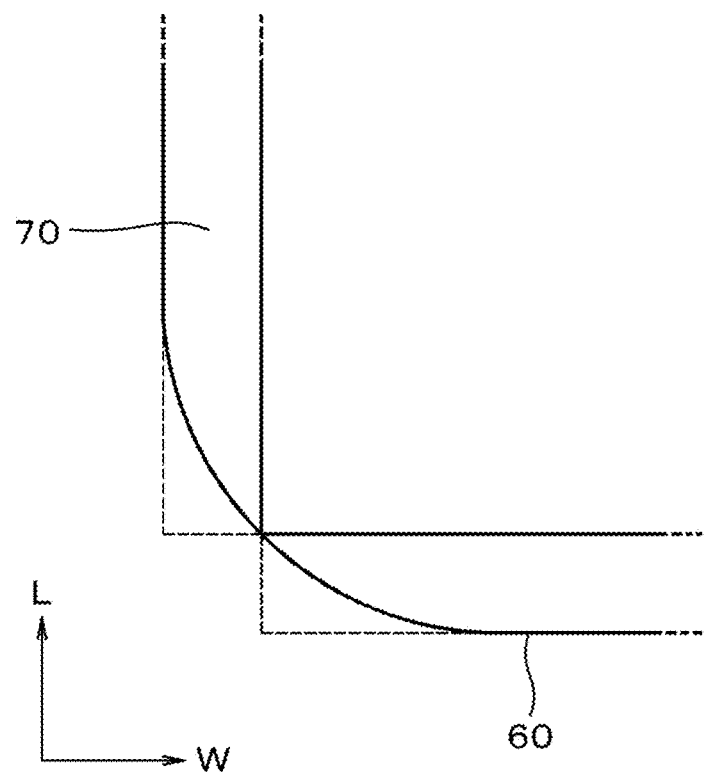
FIG. 7B is a diagram illustrating a state where a ridge is scraped off by polishing.

Then, barrel polishing is performed on the laminated chip 60 on which the ceramic green sheet 70 used in making the side margin portion is stuck. Thus, the corners and ridges are rounded, but the corners are easier to be scraped than ridges. However, since the ceramic green sheet used in making the side margin portion is not adhered on the ridge, it is possible to reduce the amount of polishing and a polishing time to form the ridge into a desired shape (see FIG. 7B). Thus, it is possible to reduce or prevent an occurrence of a situation in which the corner is scraped too much.

In a finished state, it is preferable that the corners and ridges of the outer layer-margin layer 22a in the outer layer portion 22 are rounded, but the inner layer-margin layer 22b are not scrapped. It is preferable that the corners and ridges of the outer side margin layer 23a in the side margin portion 23 are rounded, but the inner side margin layer 23b are not scrapped.

Then, barrel polishing is preferably performed on the laminated chip 60 on which the ceramic green sheet 70 for the side margin portion is adhered. Degreasing treatment is preferably performed on the laminated chip under a predetermined condition in an atmosphere of nitrogen. Then, firing treatment is performed at a predetermined temperature in an atmosphere of a mixture of nitrogen, hydrogen, and steam.

Thus, a sintered laminate is obtained.

Then, an external electrode paste including Cu, for example, as the main component is applied on both end surfaces of the sintered laminate, and the resultant is baked. Thus, the first base electrode layer 141a connected to the first internal electrode 13a and the second base electrode layer 141b connected to the second internal electrode 13b are formed. The first lower plating layer 142a is formed on the surface of the first base electrode layer 141a by Ni plating, for example, and the first upper plating layer 143a is formed on the surface of the first lower plating layer 142a by Sn plating, for example, and thus the first external electrode 14a is formed. With the similar method, the second external electrode 14b is formed.

The laminated chip and the external electrode paste may be fired simultaneously.

The multilayer ceramic capacitor 10 is preferably produced with the above-described method. The above-described manufacturing method is a non-limiting example, and the method of manufacturing the multilayer ceramic capacitor 10 is not limited to the above-described manufacturing method.

Modification Example 1

In a case where the dimension of the side margin portion 23 in the width direction W is shorter than the dimension of the outer layer portion 22 in the laminating direction T, when the multilayer ceramic capacitor 10 is viewed from the outside thereof in the width direction W, the internal electrode 13 is able to be seen through. However, when viewed from the outside thereof in the laminating direction T, the internal electrode 13 are not able to be seen though and may be seen with a different color tone.

Therefore, as illustrated in FIG. 8, a tone adjustment layer 80 may be disposed at a position having the same or substantially the same depth as the dimension of the side margin portion 23 in the width direction W, from each of the first main surface 16a and the second main surface 16b of the multilayer ceramic capacitor 10, which correspond to the outer layer portion 22.

That is, the dimension of the side margin portion 23 in the width direction W is equal or substantially equal to a distance from each of the first main surface 16a and the second main surface 16b to the tone adjustment layer 80.

The tone adjustment layer 80 is a layer that causes a color tone when the multilayer ceramic capacitor 10 is viewed from the outside thereof in the laminating direction T to be identical or substantially identical to a color tone when viewed from the outside thereof in the width direction W. For example, a dummy internal electrode made of the same material as the internal electrode 13 may preferably be disposed as the tone adjustment layer 80.

Figure 8A:
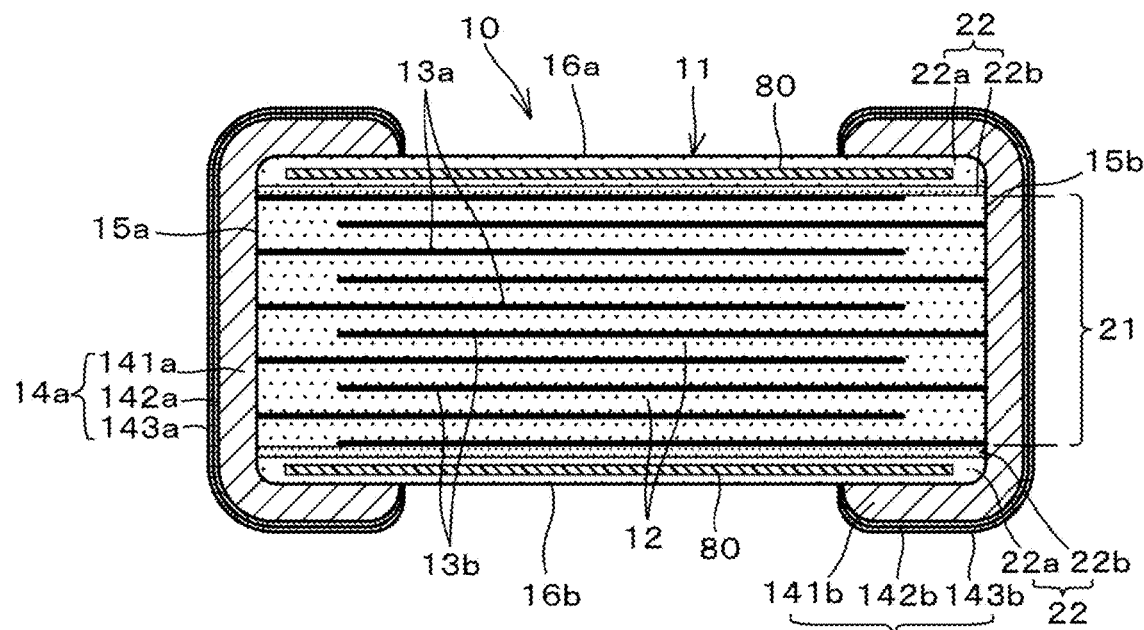
FIGS. 8A and 8B are sectional views illustrating the multilayer ceramic capacitor in which a tone adjustment layer is provided at the side margin portion.
Figure 8B:
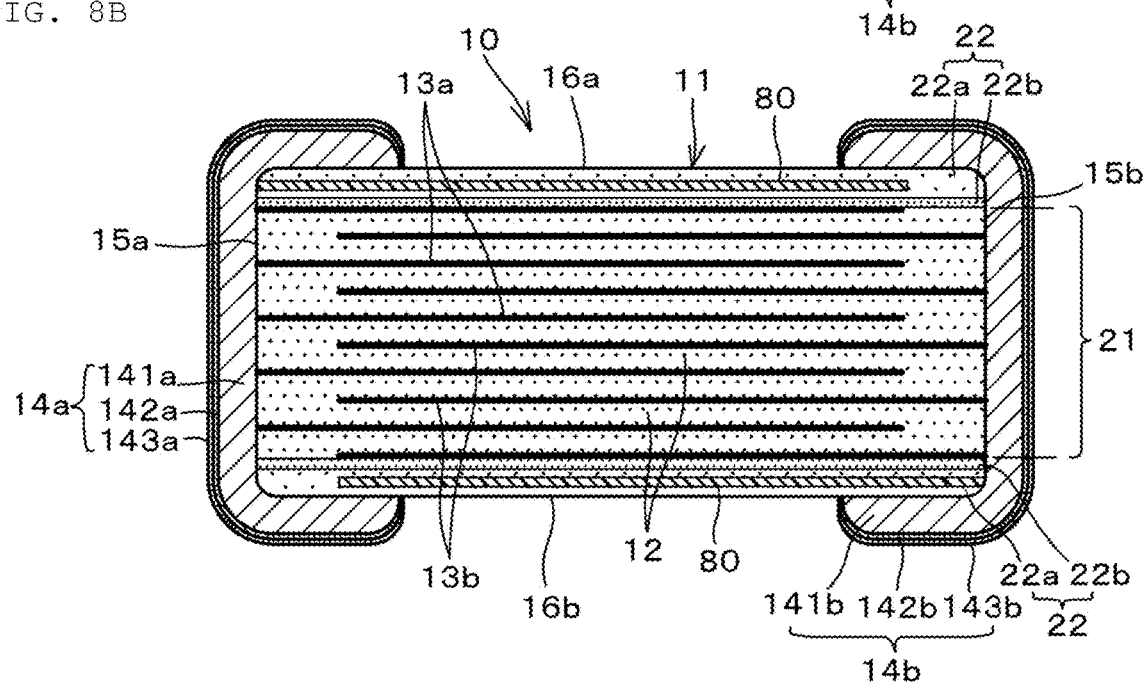

The dummy internal electrode may not be electrically connected to the external electrode 14 as illustrated in FIG. 8A, or may be electrically connected to the external electrode 14 as illustrated in FIG. 8B. In a case where the dummy internal electrode electrically connected to the external electrode 14 is provided, the dummy internal electrode is set to be electrically connected to the external electrode 14 electrically connected to the internal electrode 13 at the closest position in the laminating direction T.

Since the tone adjustment layer 80 is provided, it is possible to reduce a difference between a color tone when the multilayer ceramic capacitor 10 is viewed from the outside thereof in the width direction W and a color tone when viewed from the outside thereof in the laminating direction T.

Modification Example 2

The end portion of the internal electrode 13 in the width direction W is provided at a position close to the surface during firing, and thus oxidation easily proceeds. Therefore, an antioxidation layer may preferably be disposed in the side margin portion 23.

Figure 9:
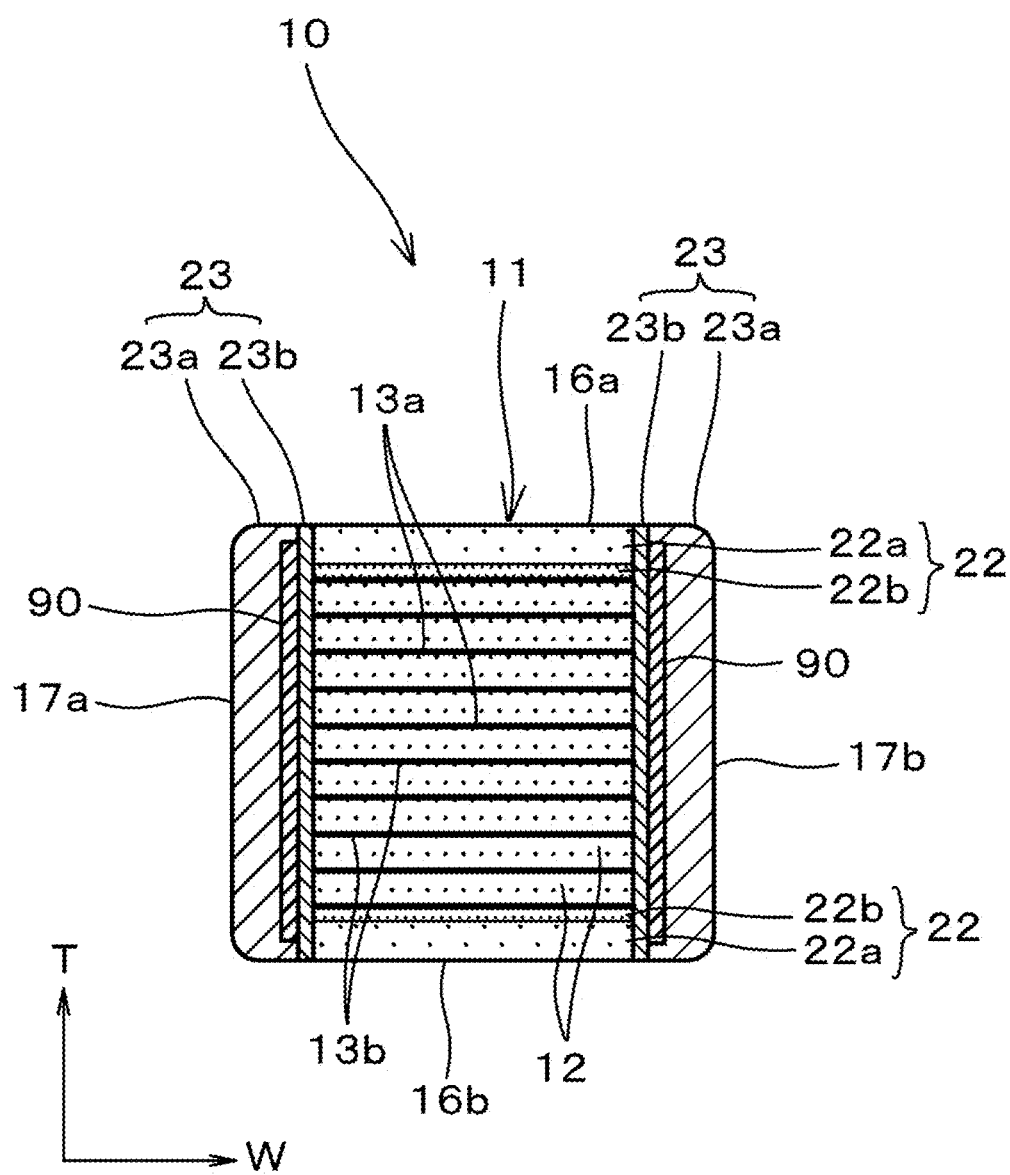
FIG. 9 is a sectional view illustrating the multilayer ceramic capacitor having a structure in which an antioxidation layer is provided at the side margin portion.

FIG. 9 is a sectional view illustrating the multilayer ceramic capacitor 10 having a structure in which an antioxidation layer 90 is preferably provided in the side margin portion 23. In the example illustrated in FIG. 9, the antioxidation layer 90 is provided between the outer side margin layer 23a and the inner side margin layer 23b of the side margin portion 23. However, a position at which the antioxidation layer 90 is provided is not limited to the position between the outer side margin layer 23a and the inner side margin layer 23b.

The antioxidation layer 90 is preferably, for example, a dummy internal electrode made of the same material as the internal electrode 13. In a case where the dummy internal electrode is disposed, the dummy internal electrode is not electrically connected to the external electrode 14. However, the dummy internal electrode may be electrically connected to the external electrode 14.

Since the antioxidation layer 90 is provided in the side margin portion 23, it is possible to prevent oxidation of the end portion of the internal electrode 13 in the width direction W during firing. Since the dummy internal electrode is disposed, as the antioxidation layer 90, in the side margin portion 23, it is possible to reduce a difference between the amount of shrinkage of the side margin portion 23 and the amount of shrinkage of the inner layer portion 21 during firing.

Modification Example 3

Figure 10:
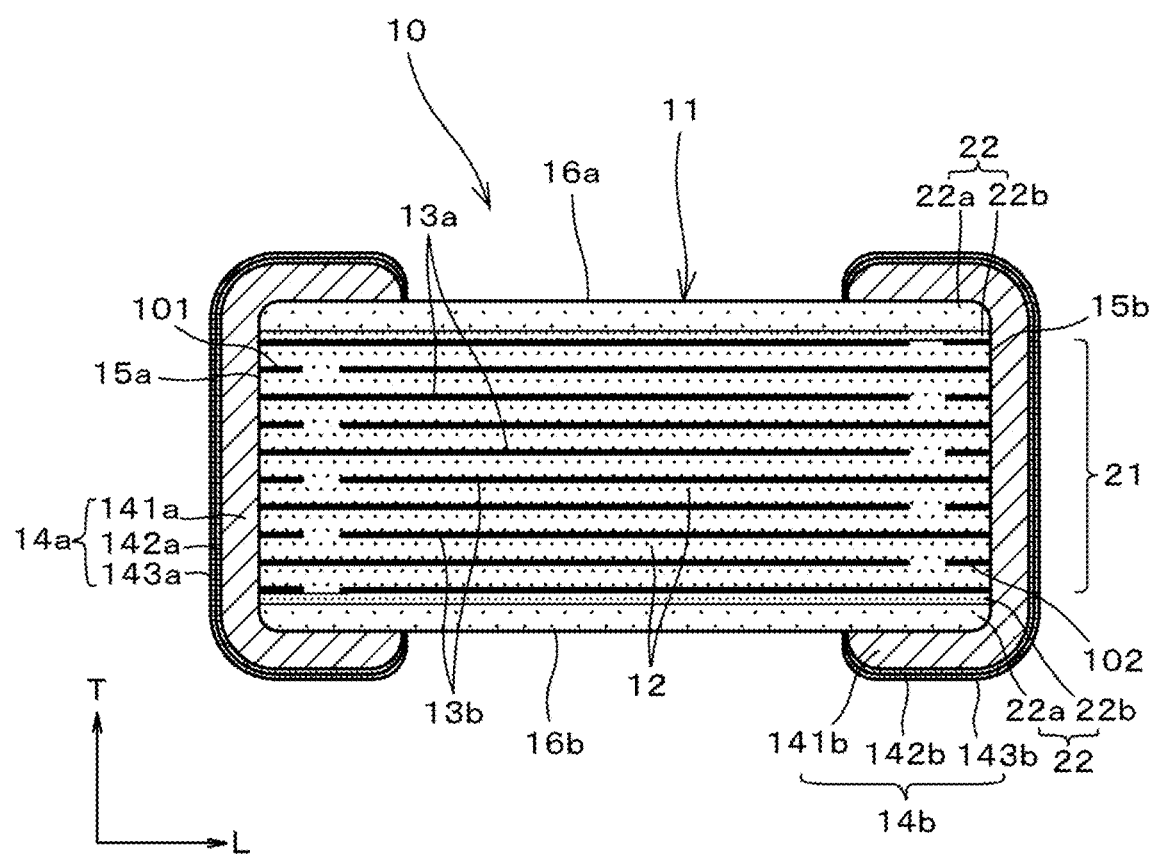
FIG. 10 is a sectional view illustrating the multilayer ceramic capacitor in which a first dummy internal electrode which is exposed to a first end surface of the laminate and is connected to a first external electrode and a second dummy internal electrode which is exposed to a second end surface of the laminate and is connected to a second external electrode are provided.

As illustrated in FIG. 10, a first dummy internal electrode 101 which is exposed to the first end surface 15a and is connected to the first external electrode 14a and a second dummy internal electrode 102 which is exposed to the second end surface 15b and is connected to the second external electrode 14b may be provided.

The first dummy internal electrode 101 is preferably provided at the same or substantially the same position as the second internal electrode 13b in the laminating direction T and is provided on the first end surface 15a side on which the second internal electrode 13b is not extended. Thus, the first dummy internal electrode 101 is not electrically connected to the second internal electrode 13b. Since the first dummy internal electrode 101 connected to the first external electrode 14a is provided at a position at which the second internal electrode 13b is not extended, a difference of the thickness between a position at which the second internal electrode 13b is provided and a position at which the second internal electrode 13b is not provided is reduced. The first dummy internal electrode 101 is a portion of the internal electrode of a neighboring laminated chip 60 during manufacturing. Thus, it is possible to reduce or prevent peeling of the dielectric layer 12 when the laminate is cut out in a chip shape.

The second dummy internal electrode 102 is preferably provided at the same or substantially the same position as the first internal electrode 13a in the laminating direction T and is provided on the second end surface 15b side on which the first internal electrode 13a is not extended. Thus, the second dummy internal electrode 102 is not electrically connected to the first internal electrode 13a. Since the second dummy internal electrode 102 connected to the second external electrode 14b is provided at a position at which the first internal electrode 13a is not extended, a difference of the thickness between a position at which the first internal electrode 13a is provided and a position at which the first internal electrode 13a is not provided is reduced. The second dummy internal electrode 102 is a portion of the internal electrode of a neighboring laminated chip 60 in manufacturing. Thus, it is possible to reduce or prevent peeling of the dielectric layer 12 when the laminate is cut out in a chip shape.

The present invention is not limited to the above-described preferred embodiments and the modification examples, and various applications and modifications may be made within the scope of the present invention.

The descriptions are made on the assumption that the outer layer portion 22 preferably includes the two layers of the outer layer-margin layer 22a and the inner layer-margin layer 22b. However, the outer layer portion 22 may include three layers or more, for example. In this case, the content of Si included in the layer-margin layer located on the outermost side in the laminating direction T among the plurality of layer-margin layers is set to be larger than the content of Si included in the layer-margin layers other than the layer-margin layer located on the outermost side.

The descriptions are made on the assumption that the side margin portion 23 preferably includes the two layers of the outer side margin layer 23a and the inner side margin layer 23b. However, the side margin portion 23 may include three layers or more, for example. In this case, the content of Si included in the side margin layer located on the outermost side in the width direction W among the plurality of side margin layers is set to be larger than the content of Si included in the side margin layers other than the side margin layer located on the outermost side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electronic component comprising:
a laminate including a plurality of dielectric layers and a plurality of internal electrodes that are alternately laminated; and
an external electrode electrically connected to the plurality of internal electrodes; wherein
the plurality of dielectric layers include dielectric ceramic particles, a particle size of the dielectric ceramic particles in a central portion of the dielectric layers is different from a particle size of the dielectric ceramic particles in an end portion of the dielectric layers in the length direction;
the laminate includes:
a first main surface and a second main surface opposing each other in a laminating direction;
a first side surface and a second side surface opposing each other in a width direction perpendicular or substantially perpendicular to the laminating direction; and
a first end surface and a second end surface opposing each other in a length direction perpendicular or substantially perpendicular to the laminating direction and the width direction;
a side margin portion is provided in a region in which the plurality of internal electrodes are not provided when a cross section of the laminate having the length direction and the width direction is viewed from the laminating direction;
an outer layer portion includes a plurality of layer-margin layers laminated in the laminating direction, the outer layer portion being a region in which the plurality of internal electrodes is not provided, in addition to the side margin portion, when a cross section of the laminate having the laminating direction and the width direction is viewed from the length direction; and
a dimension of the outer layer portion in the laminating direction is about 5 µm or more and about 95 µm or less.

2. The electronic component according to claim 1, wherein a boundary is provided between the side margin portion and the outer layer portion in the laminating direction.

3. The electronic component according to claim 1, wherein
Si is included in the plurality of layer-margin layers; and
a content of Si included in at least one of the layer-margin layers located on an outermost side in the laminating direction among the plurality of layer-margin layers is larger than a content of Si included in remaining ones of the layer-margin layers other than the one of the layer-margin layers located on the outermost side.

4. The electronic component according to claim 1, wherein a boundary is provided between a plurality of the layer-margin layers adjacent to each other in the laminating direction.

5. The electronic component according to claim 4, wherein the boundary is defined by a difference in sinterability between material defining the plurality of the layer-margin layers adjacent to each other in the laminating direction.

6. The electronic component according to claim 1, wherein a total thickness of an outer one of the plurality of the layer-margin layers adjacent in the laminating direction is greater than a total thickness of an inner one of the plurality of the layer-margin layers adjacent in the laminating direction.

7. The electronic component according to claim 1, wherein the external electrode includes a three-layer structure defined by a base electrode layer, a lower plating layer on a surface of the first base electrode layer, and an upper plating layer on a surface of the first lower plating layer.

8. The electronic component according to claim 7, wherein
the base electrode layer includes Ni, Cu, Ag, Pd, Ag—Pd alloys, or Au;
the plurality of internal electrodes include Ni;
the lower layer plating layer includes Ni; and
the external electrode layer includes Sn.

9. The electronic component according to claim 1, wherein corners and ridges of an outer one of the plurality of the layer-margin layers are rounded, and corners and ridges of an inner one of the plurality of the layer-margin layers are not rounded.

10. The electronic component according to claim 1, wherein a color tone adjustment layer is provided within the outer layer portion.

11. The electronic component according to claim 10, wherein the color tone adjustment layer is defined by a dummy internal electrode that is not electrically connected to the external electrode.

12. The electronic component according to claim 10, wherein the color tone adjustment layer is defined by a dummy internal electrode that is electrically connected to the external electrode.

13. The electronic component according to claim 1, wherein an antioxidation layer is provided within the side margin portion, the antioxidation layer being defined by a dummy internal electrode which is not electrically connected to the external electrode.

14. The electronic component according to claim 1, wherein the laminate further includes a first dummy internal electrode that is exposed to the first end surface and a second dummy internal electrode that is exposed to the second end surface.

* * * * *